(12) United States Patent
Kuroki

(10) Patent No.: US 10,417,312 B2
(45) Date of Patent: Sep. 17, 2019

(54) INFORMATION ADDED DOCUMENT PREPARATION DEVICE, NON-TRANSITORY COMPUTER-READABLE RECORDING MEDIUM AND INFORMATION ADDED DOCUMENT PREPARATION METHOD FOR SELECTING A FORMAT FOR ADDING INFORMATION TO A DOCUMENT TO SATISFY A LAYOUT CONDITION

(71) Applicant: Konica Minolta, Inc., Chiyoda-ku, Tokyo (JP)

(72) Inventor: Jun Kuroki, Kanagawa (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 15/294,462

(22) Filed: Oct. 14, 2016

(65) Prior Publication Data
US 2017/0286370 A1     Oct. 5, 2017

(30) Foreign Application Priority Data

Oct. 29, 2015 (JP) .................................. 2015-213349

(51) Int. Cl.
*G06F 17/00* (2019.01)
*G06F 17/21* (2006.01)
(Continued)

(52) U.S. Cl.
CPC ............ *G06F 17/22* (2013.01); *G06F 17/215* (2013.01); *G06F 17/2223* (2013.01);
(Continued)

(58) Field of Classification Search
CPC .. G06F 17/289; G06F 17/241; G06F 17/2854; G06F 17/2836; G06F 17/211; G06F 17/28; G06F 17/212; G06F 17/2264
See application file for complete search history.

(56) References Cited

U.S. PATENT DOCUMENTS

2003/0046075 A1* 3/2003 Stone .................. G06F 17/2809
                                                                    704/257
2006/0095249 A1* 5/2006 Kong .................... G06F 17/289
                                                                    704/7
(Continued)

FOREIGN PATENT DOCUMENTS

JP      2005-267102 A    9/2005
JP      2007-066264 A    3/2007
(Continued)

OTHER PUBLICATIONS

Notice of Reason for Refusal dated Dec. 27, 2017, in Japanese Patent Application No. 2015-213349, 11 pages including English translation.

*Primary Examiner* — Ariel Mercado
(74) *Attorney, Agent, or Firm* — Squire Patton Boggs (US) LLP

(57) ABSTRACT

Disclosed is an information added document preparation device including: a selection unit configured to select an addition format to be used when predetermined additional information is added to an original document; and an information adding unit configured to prepare a document in which the predetermined additional information is added to the original document in the addition format selected by the selection unit, wherein the selection unit selects the addition format in which the document prepared by the information adding unit satisfies a predetermined layout condition, among a plurality of addition formats which are previously prepared.

24 Claims, 13 Drawing Sheets

(51) Int. Cl.
*G06F 17/22* (2006.01)
*G06F 17/24* (2006.01)
*G06F 17/27* (2006.01)
*G09G 5/42* (2006.01)

(52) U.S. Cl.
CPC .......... *G06F 17/241* (2013.01); *G06F 17/275* (2013.01); *G09G 5/42* (2013.01)

(56) References Cited

U.S. PATENT DOCUMENTS

| | | | |
|---|---|---|---|
| 2006/0217955 A1* | 9/2006 | Nagao | G06F 17/289 704/2 |
| 2008/0043285 A1* | 2/2008 | Nakagiri | G06F 17/212 358/1.15 |
| 2009/0296124 A1* | 12/2009 | Ohguro | G06F 17/241 358/1.9 |
| 2011/0209044 A1* | 8/2011 | Kutsumi | G06T 11/60 715/232 |
| 2011/0276872 A1* | 11/2011 | Kataria | G06F 17/214 715/234 |
| 2012/0102393 A1* | 4/2012 | Kutsumi | G06F 17/214 715/243 |
| 2012/0117461 A1* | 5/2012 | Sata | G06F 17/211 715/243 |
| 2015/0261746 A1* | 9/2015 | Shimazu | G06F 17/289 704/2 |

FOREIGN PATENT DOCUMENTS

| | | |
|---|---|---|
| JP | 2009-294788 A | 12/2009 |
| JP | 2014-203338 A | 10/2014 |

\* cited by examiner

INFORMATION ADDED DOCUMENT PREPARATION DEVICE, NON-TRANSITORY COMPUTER-READABLE RECORDING MEDIUM AND INFORMATION ADDED DOCUMENT PREPARATION METHOD FOR SELECTING A FORMAT FOR ADDING INFORMATION TO A DOCUMENT TO SATISFY A LAYOUT CONDITION

CROSS-REFERENCE TO RELATED APPLICATION

The present U.S. patent application claims the priority of Japanese Patent Application No. 2015-213349, filed on Oct. 29, 2015, according to the Paris Convention, and the entirety of which is incorporated herein by reference for correction of incorrect translation.

BACKGROUND OF THE INVENTION

Field of the Invention

The present invention relates to an information added document preparation device, a non-transitory computer-readable recording medium and an information added document preparation method for adding the additional information, such as kana pronouncing or the like, to an original document.

Description of Related Art

As a function for displaying the document so as to easily understand the contents of the document, there is a function for adding the kana pronouncing to the Chinese characters, or adding the Japanese translation of the English word. In general, as a method for adding the kana pronouncing, the method for adding the kana pronouncing to the upper side of the corresponding text is known.

In Japanese Patent Application Publication No. 2005-267102, the following technology is disclosed. In this technology, when the superscript ruby is added to the document, the intervals between the characters in the text of the original document are not adjusted to the width of the text of the ruby to be added. The text of the ruby is arranged without changing the width of each character in the original document. Thereby, the style of the document is prevented from being deteriorated by adding the ruby.

In general, because the ruby or the kana pronouncing is inserted into the space between the lines of the text, when the space is narrow, the ruby or the kana pronouncing is inserted by widening the space.

In case that the space is widened, because all of the lines of the text in the original document are shifted, the component elements, such as the objects, arranged in the specific page of the original document cannot be arranged within the above specific page after the ruby or the like is inserted. As a result, the favorable layout condition is not satisfied, for example, some of the component elements are moved to the next page and the number of the pages of the document is increased.

SUMMARY

To achieve at least one of the abovementioned objects, an information added document preparation device reflecting one aspect of the present invention, comprises:

a selection unit configured to select an addition format to be used when predetermined additional information is added to an original document; and an information adding unit configured to prepare a document in which the predetermined additional information is added to the original document in the addition format selected by the selection unit, wherein the selection unit selects the addition format in which the document prepared by the information adding unit satisfies a predetermined layout condition, among a plurality of addition formats which are previously prepared.

BRIEF DESCRIPTION OF THE DRAWINGS

The present invention will become more fully understood from the detailed description given hereinafter and the accompanying drawings given by way of illustration only, and thus are not intended as a definition of the limits of the present invention, and wherein.

DETAILED DESCRIPTION OF PREFERRED EMBODIMENT

Hereinafter, a preferred embodiment of the present invention will be explained with reference to the accompanying drawings.

Figure 1:
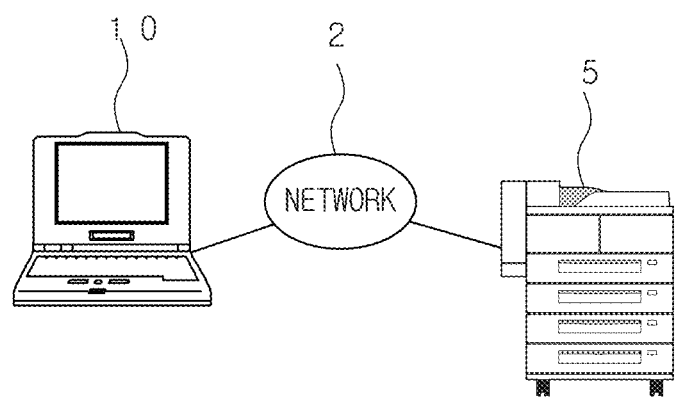
FIG. 1 is a view showing an example of the configuration of the data processing system including the information added document preparation device according to the embodiment.

FIG. 1 shows the data processing system including the information added document preparation device 10 according to the embodiment. The information added document preparation device 10 is connected with the network 2. Further, a multi function peripheral 5 is connected with the network 2. The multi function peripheral 5 is an image forming apparatus having a scan function for optically reading an original, a copy function for printing out a read image on a recording sheet, a PC print function for printing an image in accordance with the print data received from an external device, such as the information added document preparation device 10 or the like.

The information added document preparation device 10 has the function for inputting an original document and for automatically preparing a document in which the additional information, such as kana pronouncing, ruby, translation, explanatory note and the like, is added. The prepared document is displayed by the information added document preparation device 10, and is printed by transmitting the data thereof to the multi function peripheral 5.

The information added document preparation device 10 adds the additional information by selecting the addition format in which in case that the information added document preparation device 10 adds the additional information, such as the kana pronouncing, the document obtained by adding the additional information satisfies the predetermined layout condition, among a plurality of addition formats which are previously prepared.

The addition format includes a first addition format in which the additional information is added along the target text of the original document in the space between the lines of the text of the original document, and a second addition format in which the additional information is added with parentheses behind the target text of the original document. For example, in case that the kana pronouncing as the additional information is added to the Chinese characters, in the first addition format, the kana pronouncing indicated by small characters is added above the Chinese characters. In the second addition format, the kana pronouncing is added with parentheses behind the Chinese characters. The addition format is not limited to the above formats. For example, in case that explanatory note of the meanings of the word is added as the additional information, the additional information may be added by using a balloon.

For example, the layout condition includes the retention of the page allocation of the original document or the condition in which when the prepared document is printed at the designated print setting, the number of the output sheets of the printed document is not increased from the number of output sheets to be used by printing the original document. The layout condition may include the limitation of the reduction ratio of the image in case that the additional information is added by using the space obtained by reducing the image or the like in each page.

Figure 2:
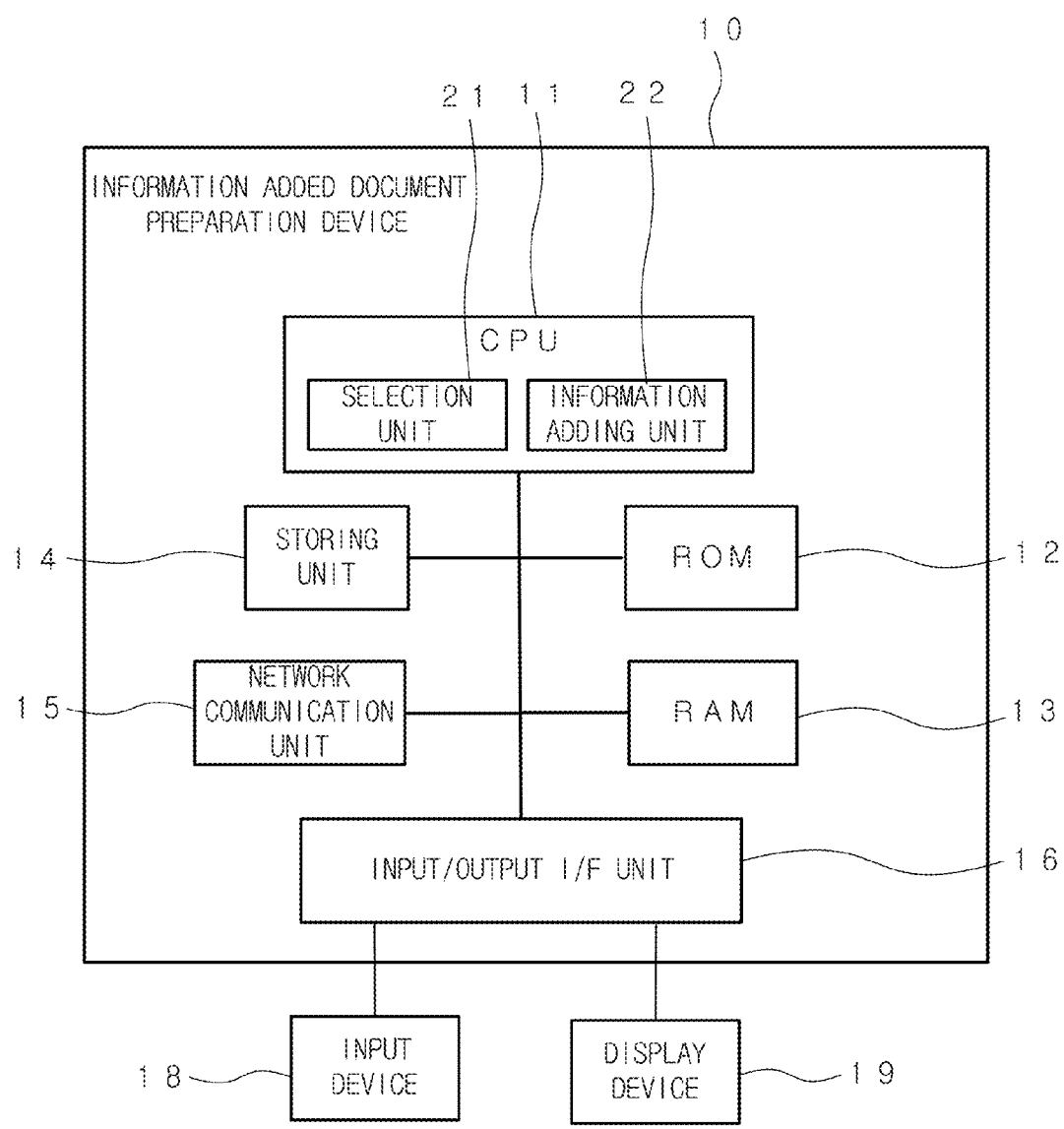
FIG. 2 is a block diagram showing the schematic configuration of the information added document preparation device.

FIG. 2 is a block diagram showing the schematic configuration of the information added document preparation device 10. In the information added document preparation device 10, a CPU (Central Processing Unit) 11 is connected with a ROM (Read Only Memory) 12, a RAM (Random Access Memory) 13, a storing device 14, a network communication unit 15, an input/output I/F unit 16 and the like via a bus. The input/output I/F unit 16 is connected with a display device 19, such as a liquid crystal display or the like, and an input device 18 for inputting various types of operations from a user. The input device 18 includes a keyboard, various types of hardware switches, a touch panel provided on the display screen of the display device, and the like.

By the CPU 11, a middleware, application programs and the like are executed on an OS (Operating System) program as a base. In the ROM 12, various types of programs are stored. By executing various types of processes by the CPU 11 in accordance with the programs, each function of the information added document preparation device 10 is realized. By executing the programs, the CPU 11 functions as the selection unit 21 for selecting the addition format for adding the predetermined additional information to the original document, and the information adding unit 22 for preparing the document in which the additional information is added to the original document in the addition format selected by the selection unit 21.

The RAM 13 is used as a work memory for temporarily storing various data when the CPU 11 executes the process in accordance with the programs, and as a memory for storing the data to be used for displaying the document.

The storing device 14 is configured by a nonvolatile memory, a hard disk drive and the like. In the storing device 14, various types of setting information, programs, the electronic data of the original documents and the prepared documents and the like are stored.

The network communication unit 15 has the function for communicating with the multi function peripheral 5 and various types of external devices via a wired or a wireless network.

The function of the information added document preparation device 10 may be realized by executing the predetermined program in a general purpose information processing device, such as a personal computer, a smart phone, a tablet or the like. Further, a server or the multi function peripheral 5 provided on the network may function as the information added document preparation device 10 (the function for adding the additional information to the document).

Figure 3:
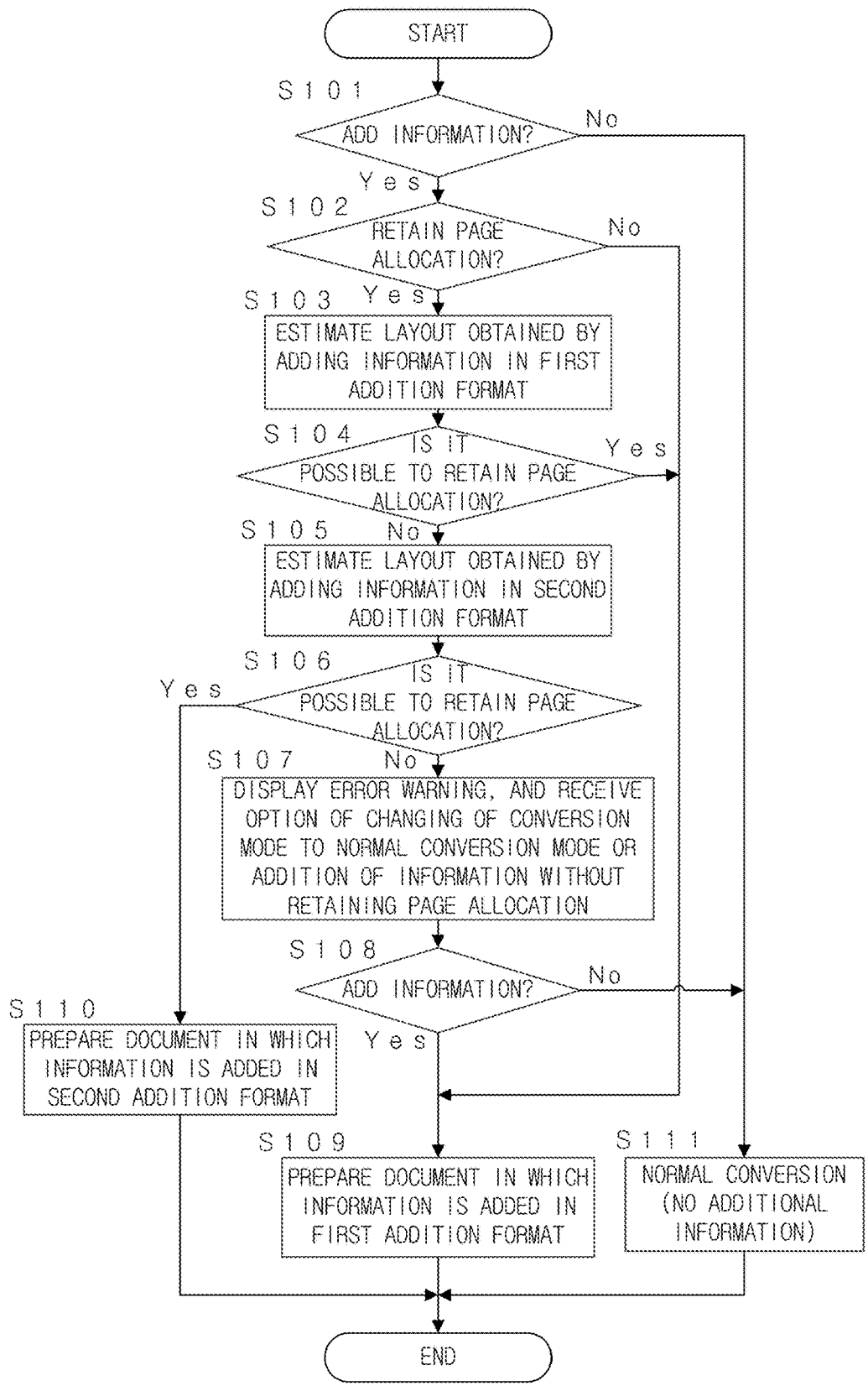
FIG. 3 is a flowchart showing the process for adding the additional information to the original document by the information added document preparation device.

FIG. 3 shows the process for adding the additional information to the original document by the information added document preparation device 10. In this embodiment, the additional information is added according to the user's request in the format conversion process for converting the original document designated by a user to the document having another format.

When the format conversion process is carried out, the information added document preparation device 10 inquires of the user about the conversion mode (Step S101). The conversion mode includes the information adding conversion mode for adding the additional information and carrying out the format conversion, and the normal conversion mode for carrying out the format conversion without adding the additional information. The information added document preparation device 10 inquires of the user about the conversion mode to be used.

Hereinafter, the case in which the kana pronouncing as the additional information is added to the Chinese characters, will be explained.

Figure 4:
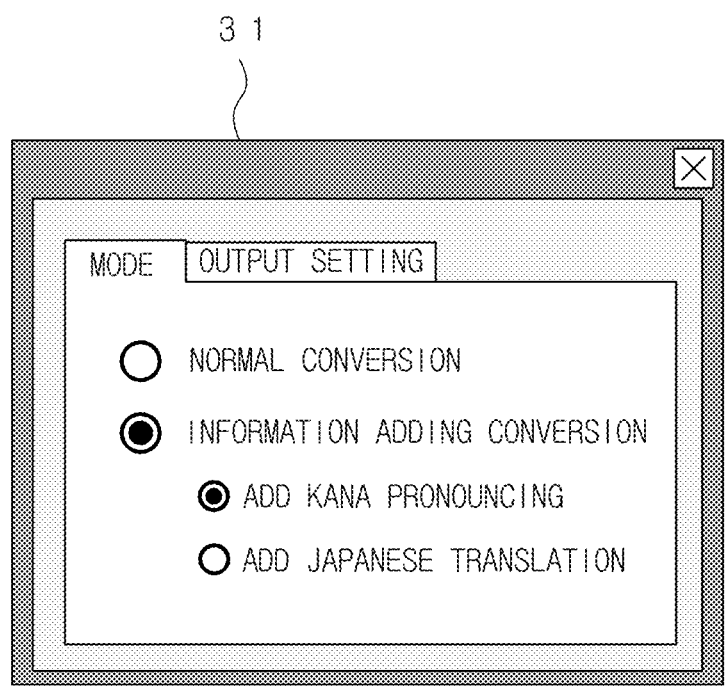
FIG. 4 is a view showing an example of the mode selection dialog which is displayed on the display device connected with the information added document preparation device when the information added document preparation device inquires of a user about the conversion mode.

FIG. 4 shows an example of the mode selection dialog 31 which is a UI (User Interface) displayed on the display device 19 connected with the information added document preparation device 10 when the information added document preparation device 10 inquires of the user about the conversion mode. In the mode selection dialog 31, the user can select one conversion mode from the normal conversion mode and the information adding conversion mode. In case that the information adding conversion mode is selected, the user further selects one of the kana pronouncing addition mode for adding the kana pronouncing as the additional information, and the word translation mode for adding the Japanese translation of the foreign language word, such as the English word.

In case that the normal conversion mode is selected (Step S101; No in FIG. 3), the document is prepared by carrying out only the format conversion process without adding the information, such as the kana pronouncing (Step S111). Then, the process is ended.

In case that the information adding conversion mode is selected (Step S101; Yes), the information added document preparation device 10 receives the setting of the layout condition (the output setting) for the document prepared in case that the additional information, such as the kana pronouncing, is added (Step S102).

Figure 5:
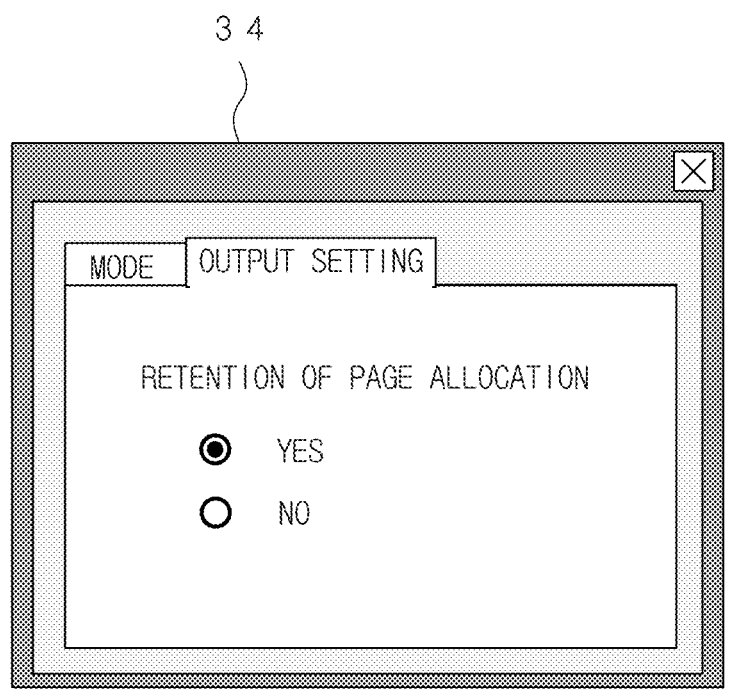
FIG. 5 is a view showing an example of the output setting dialog which is displayed on the display device connected with the information added document preparation device when the setting of the layout condition is received from a user.

FIG. 5 shows an example of the output setting dialog 34 which is a UI displayed on the display device 19 connected with the information added document preparation device 10 when the setting of the layout condition is received from the user. In this embodiment, the layout condition is the retention of the page allocation of the original document (even if the additional information is added, the number of pages of the prepared document is not increased). The information added document preparation device 10 receives the selection as to whether the above condition is added (the page allocation of the original document is retained or not).

In case that the option "the page allocation is not retained" is selected (Step S102; No), the document in which the additional information is added in the first addition format is prepared regardless of whether the page allocation is changed (Step S109). The process is ended.

As described above, the first addition format is the addition format in which the additional information is added along the target text of the original document in the space between the lines of the text of the original document. In case that the text is written horizontally, the kana pronouncing indicated by small characters is added above the Chinese characters. In case that the text is written vertically, the kana pronouncing indicated by small characters is added on the right side of the Chinese characters.

Figure 6:
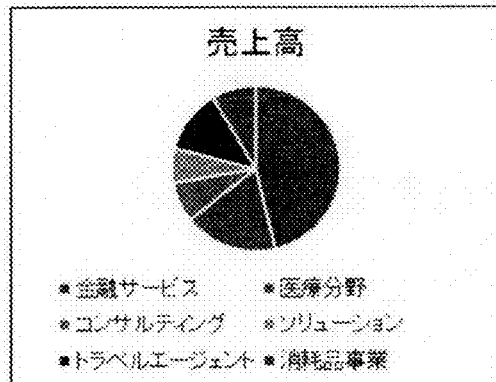
FIG. 6 is a view showing an example of the original document.
Figure 7:
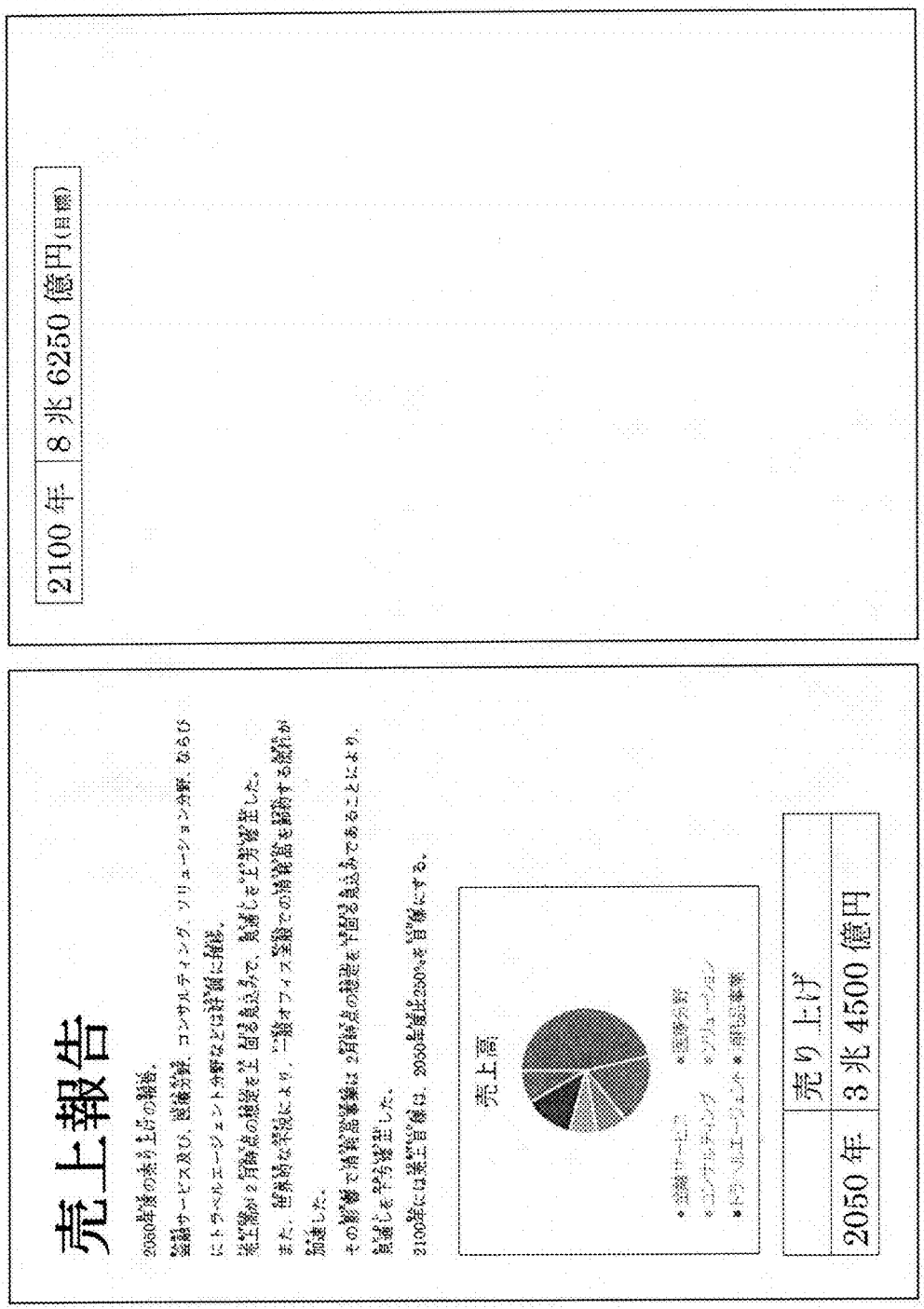
FIG. 7 is a view showing an example of the information added document which is prepared by adding the kana pronouncing to each Chinese character in the text area of the original document shown in FIG. 6 without satisfying the layout condition in which the page allocation is retained.

FIG. 6 shows an example of the original document. FIG. 7 shows an example of the document (information added document) which is prepared by adding the kana pronouncing to each Chinese character in the text area of the original document shown in FIG. 6. In FIG. 7, by adding the kana pronouncing to the Chinese characters in the text area in the first addition format, the space between the lines is widened. As a result, the table and graph which are arranged below the text area are shifted to the lower side of the page, and a part of the table is moved to the next page. In this way, there are some cases in which the arrangement of the contents described in one page of the original document is changed by adding the kana pronouncing in the first addition format and the page allocation is changed.

In case that the option "the page allocation is retained" is selected (Step S102; Yes), the information added document preparation device 10 estimates the layout of the document to be prepared when the additional information (kana pronouncing) is added to the original document in the first addition format (Step S103), and judges whether the page allocation of the original document is retained in the document obtained by adding the additional information (Step S104).

Figure 8:
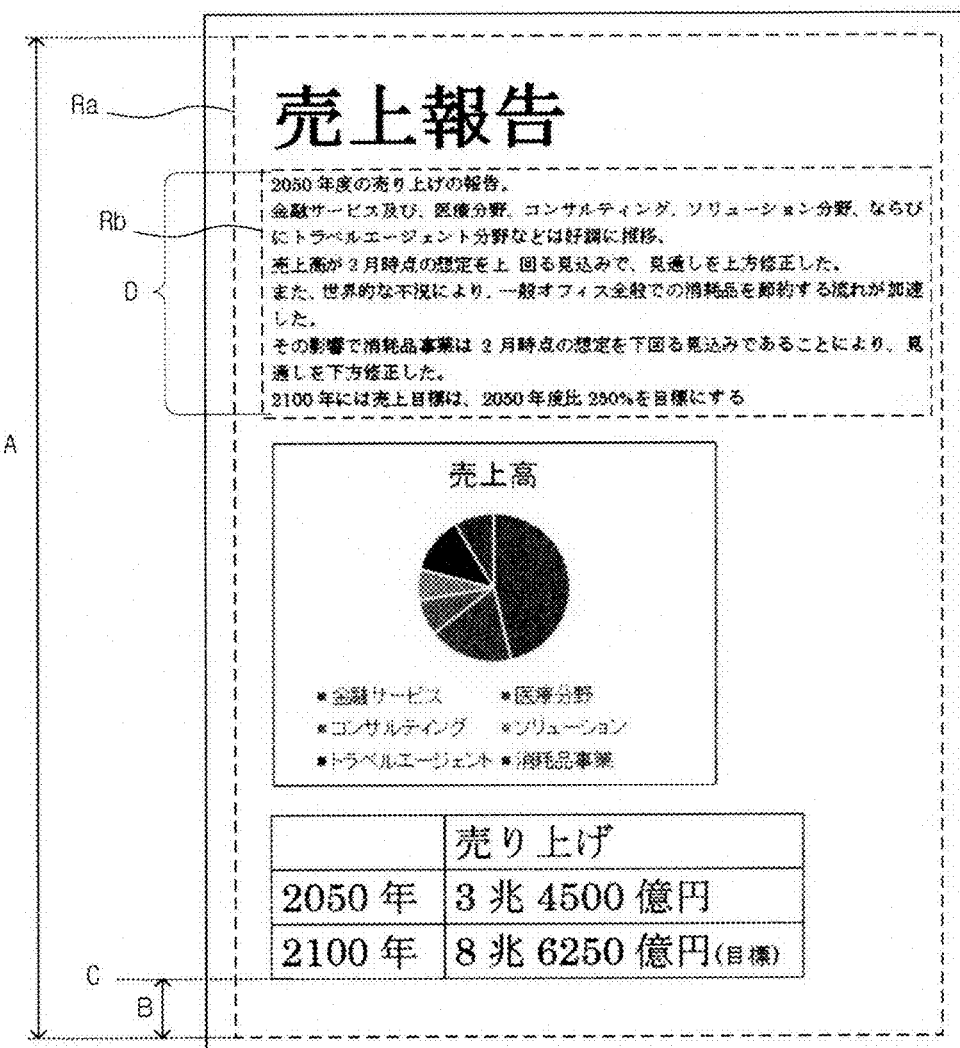
FIG. 8 is a view showing an example of the method for estimating the layout of the document in which the additional information is added in the first addition format and judging whether the page allocation is retained in the document obtained by adding the additional information.

FIG. 8 shows an example of the method for estimating the layout of the document in which the additional information is added in the first addition format and judging whether the page allocation of the original document is retained in the document obtained by adding the additional information. Firstly, the object arrangeable area Ra is calculated, and further the height A of the object arrangeable area Ra is calculated. In the drawing, the object arrangeable area Ra is shown by a broken line. The object arrangeable area Ra is an area except the margin area which is set in the four edge portions of the page. In case that the document is printed, the object arrangeable area Ra may be the area except the print prohibition area which is provided in the four edge portions of the page.

Next, by analyzing the layout of the document, the lowest position C of the object arranged on the bottom part of the page is calculated. Further, the height B of the object arrangeable blank space of the object arrangeable area Ra is calculated.

Next, the area (the target text area Rb) for arranging the target text to which the additional information (kana pronouncing) is added when the information added document is prepared is detected, and the number D of lines of the text arranged in the target text area Rb is calculated. In this drawing, the target text area Rb is shown by a broken line. The target text area Rb is automatically detected by analyzing the layout of the document, or is designated by a user.

Next, the increase E in the space between two adjacent lines in the target text area Rb, which is caused by adding the additional information is calculated, and further the height F ($F=D \times E$) of the required blank space is calculated by multiplying the number D of lines in the target text area Rb by the increase E. The increase E is determined in accordance with the character size of the kana pronouncing to be added. This character size can be changed by the user.

Next, the height F of the required blank space is compared with the height B of the object arrangeable blank space. In case that F is not more than B ($F \leq B$), it is judged that the page allocation can be retained. In case that F is more than B ($F>B$), it is judged that the page allocation cannot be retained.

When the page allocation of the original document can be retained in case that the additional information is added in the first addition format (Step S104; Yes in FIG. 3), the document in which the additional information is added in the first addition format is prepared (Step S109). Then, the process is ended.

When the page allocation cannot be retained in case that the additional information is added in the first addition format (Step S104; No), the information added document preparation device 10 estimates the layout of the document to be prepared when the additional information (kana pronouncing) is added to the original document in the second addition format (Step S105), and judges whether the page allocation of the original document is retained in the document obtained by adding the additional information (Step S106). The second addition format is the addition format in which the additional information (kana pronouncing) is added with parentheses behind the target text.

Figure 9:
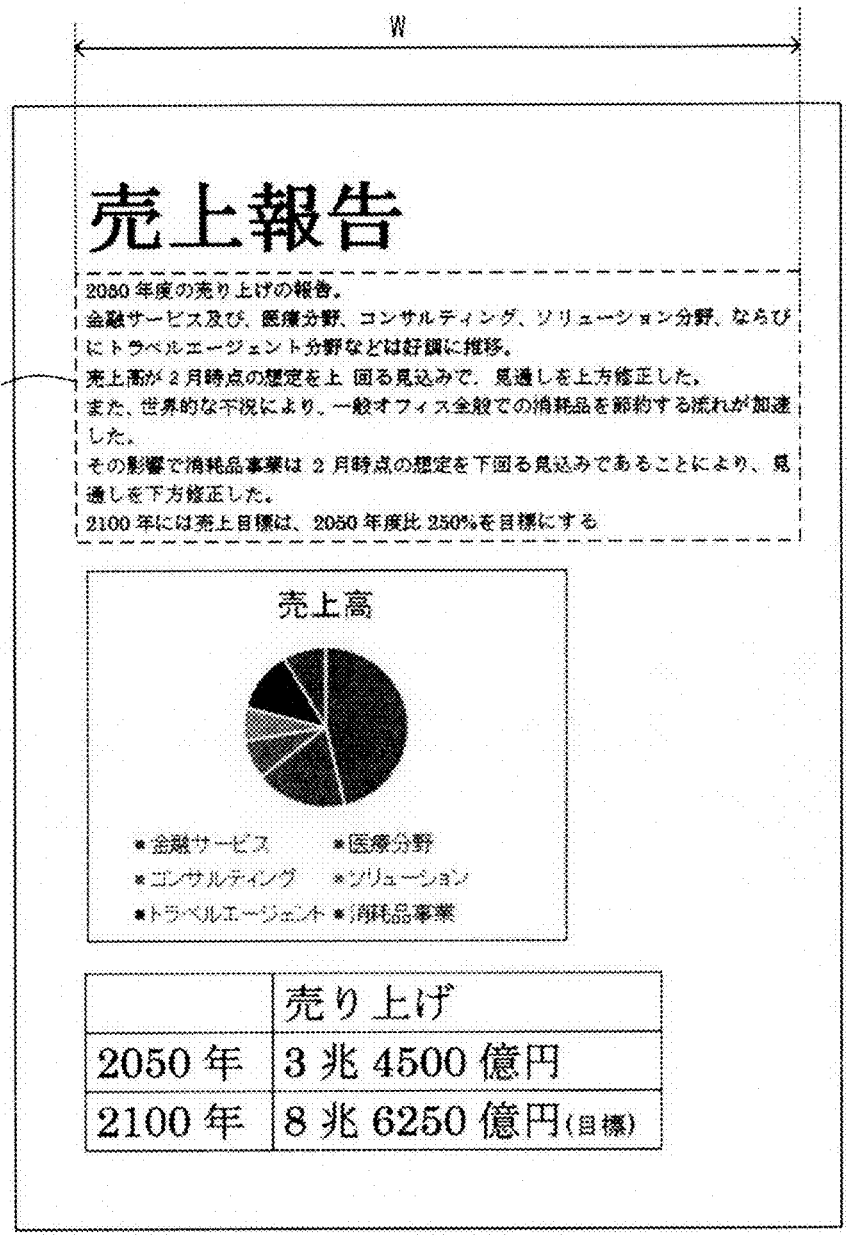
FIG. 9 is a view showing the text area detected when the layout of the document in which the additional information is added in the second addition format is estimated, and the maximum text arrangeable width of the text area.
Figure 10:
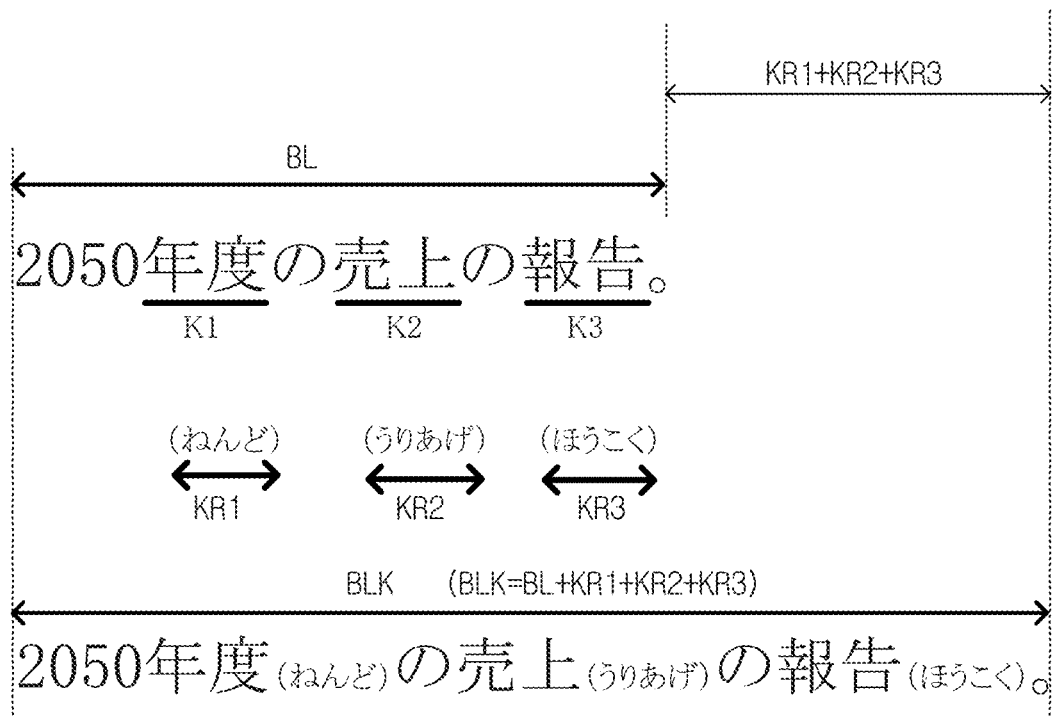
FIG. 10 is a view showing the length of the sentence in which the kana pronouncing is added in the second addition format.

The method for estimating the layout of the document to be prepared when the additional information is added in the second addition format and for judging whether the page allocation of the original document is retained in the document obtained by adding the additional information, will be explained by referring to FIG. 9 and FIG. 10.

Firstly, the text area (the target text area Rb) for arranging the target text to which the additional information (kana pronouncing) is added when the information added document is prepared is detected. Further, the maximum width in which one line of the text can be arranged (the maximum text arrangeable width W) is detected.

Next, the information added document preparation device 10 calculates the length of the sentence in which the kana pronouncing is added as the additional information with the parentheses, for each sentence arranged in the target text area Rb (one sentence which is separated by a period (in Japanese, kuten (。)). FIG. 10 shows an example of the case in which the additional information is added to one sentence "2050年度 の売上の報告。" (Report on sales in fiscal 2050.). The length of this sentence is BL. From this sentence, the target texts (K1, K2 and K3) which are the texts (Chinese characters) in which the additional information (kana pronouncing) is added when the information added document is prepared, are detected. The information added document preparation device 10 calculates the added text length (KR1, KR2 and KR3) of each target text, which is the required text length for adding the additional information with the parentheses. Then, the length BLK (BLK=BL+KR1+KR2+KR3) of the sentence in which the additional information is added is calculated by adding the added text lengths (KR1, KR2 and KR3) to the length BK of the original sentence.

The value obtained by adding 1 to the quotient calculated by dividing BLK by W is calculated as the required number of lines for arranging the sentence in which the additional information is added. The above calculation is executed for all of the sentences arranged in the target text area Rb. Then, the total required number M of lines, which is the sum of the calculated required numbers of lines, is calculated.

The total required number M is compared with the number D of lines of the original text arranged in the target text area Rb, and the height H of the required blank space for the lines (M−D) increased by adding the additional information is calculated. Then, the height H of the required blank space is compared with the height B of the object arrangeable blank space (See FIG. 8). In case that H is not more than B (H≤B), it is judged that the page allocation of the original document can be retained. In case that H is more than B (H>B), it is judged that the page allocation cannot be retained.

Figure 11:
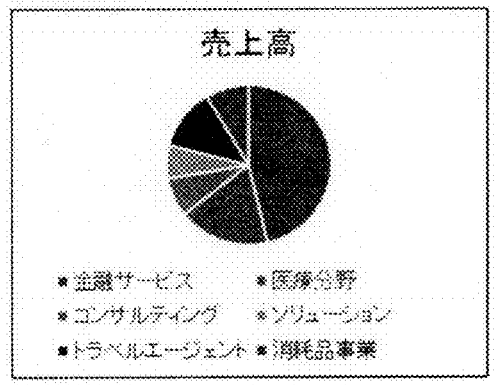
FIG. 11 is a view showing an example of the printed document in which the additional information is added in the second addition format.

When the page allocation of the original document can be retained in case that the additional information is added in the second addition format (Step S106; Yes in FIG. 3), the document in which the additional information is added in the second addition format is prepared (Step S110). Then, the process is ended. FIG. 11 shows an example of the document which is prepared in Step S110.

Figure 12:
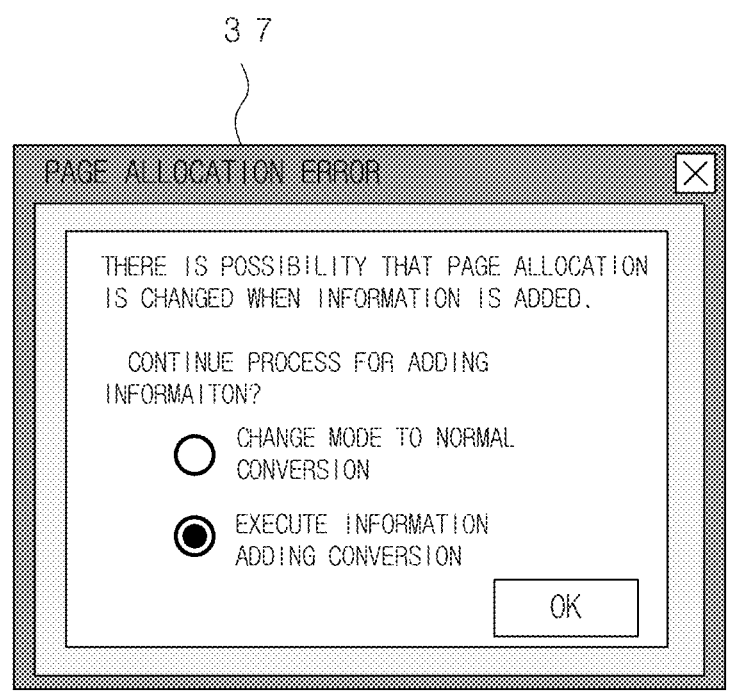
FIG. 12 is a view showing an example of the page allocation error dialog which is displayed as an error warning in case that the layout condition cannot be retained in either the first addition format or the second addition format.

When the page allocation cannot be retained in case that the additional information is added in the second addition format (Step S106; No), the information added document preparation device 10 warns the user as an error warning, and receives the option of the changing of the conversion mode to the normal conversion mode or the execution of the information adding conversion without retaining the page allocation, from the user (Step S107). FIG. 12 shows an example of the page allocation error dialog 37 which is an UI displayed on the display device 19 connected with the information added document preparation device 10 in order to execute the above error warning and receive the option from the user. In this drawing, the option of the execution of the information adding conversion without retaining the page allocation is selected.

In case that the option of the execution of the information adding conversion is selected in the page allocation error dialog 37 (Step S108; Yes in FIG. 3), the page allocation of the original document cannot be retained, but the document in which the additional information is added in the first addition format is prepared (Step S109). Then, the process is ended.

In case that the option of the changing of the conversion mode to the normal conversion mode is selected in the page allocation error dialog 37 (Step S108; No), the document is prepared only by the format conversion without adding the information, such as the kana pronouncing (Step S111). Then the process is ended.

As described above, in case that the information added document preparation device 10 is instructed to retain the page allocation of the original document as the layout condition, the information added document preparation device 10 adds the additional information by automatically selecting the addition format in which the prepared document satisfies the layout condition between the first addition format and the second addition format. Therefore, it is possible to add the additional information, such as the kana pronouncing or the like, to the original document in a suitable addition format.

Further, because the first addition formation is preferable to the second addition format in case that the kana pronouncing is added, the first addition format is preferentially used more than the second addition format. Therefore, the additional information can be added in a preferable addition format as much as possible.

In this embodiment, the layout condition is explained as the retention of the page allocation of the original document. However, in case of the format conversion for the printing, the layout condition may be set to the condition in which when the document is printed at the designated print setting, the number of output sheets of the printed document is not increased from the number of output sheet to be used by printing the original document. In this case, the print setting to be considered is the aggregate print setting (so-called "Nin1") in which a plurality of pages are reduced and are aggregated and arranged in one sheet.

Figure 13:
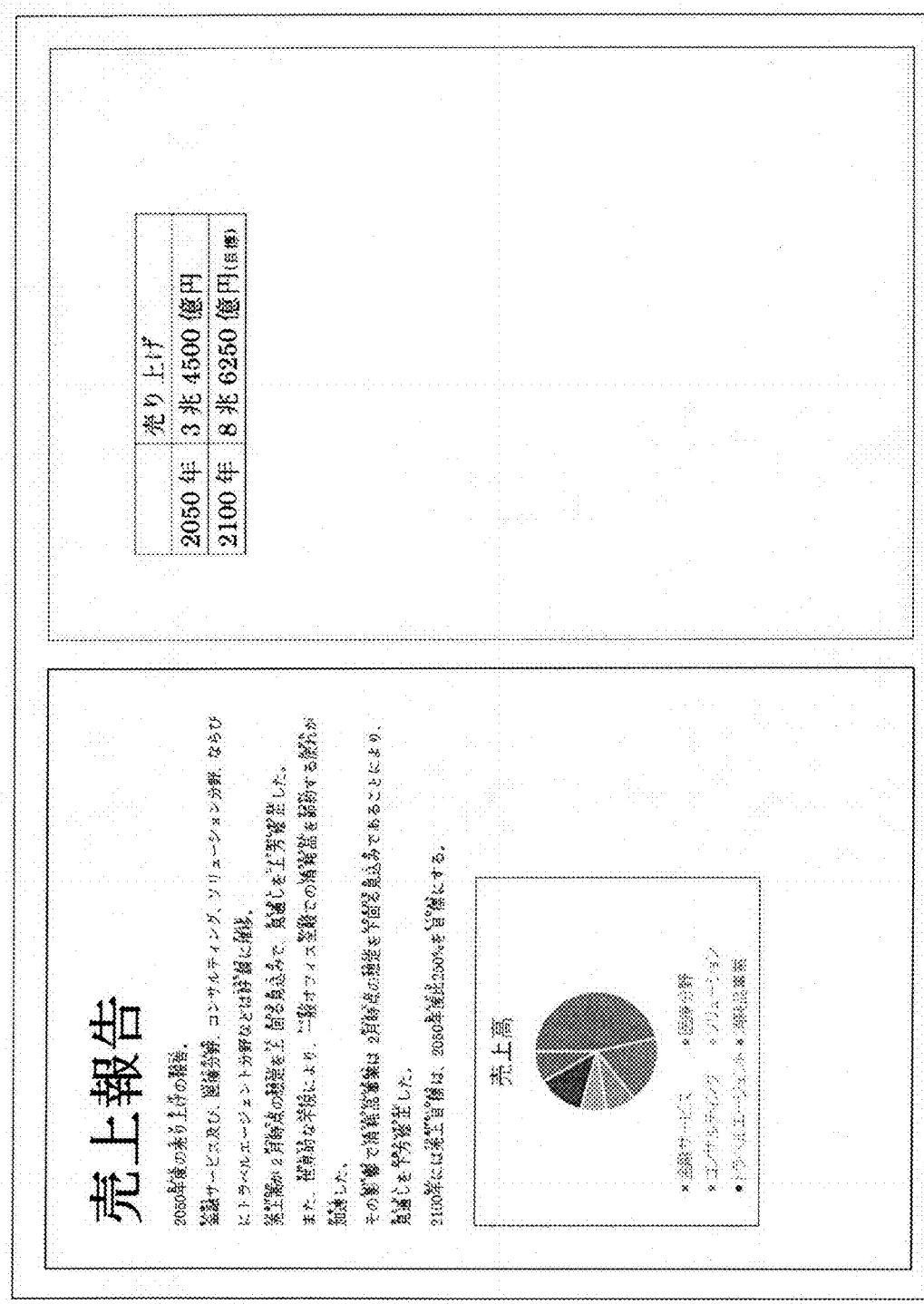
FIG. 13 is a view showing an example of the printed document in which the page allocation is changed so as to move some of the objects to the second page by adding the additional information, the document being printed in the aggregate print setting "2in1".

FIG. 13 shows an example of the printed document in which the page allocation is changed so as to move some of the objects to the second page by adding the additional information. The above document is printed at the aggregate print setting "2in1".

The charge method which is used when the document is printed by the multi function peripheral 5 is usually a method in which the user is charged according to the color/monochrome printing and the number of output sheets. Therefore, even if the number of pages of the document is increased from one page to two pages by adding the additional information, such as the kana pronouncing or the like, in the first addition format, when the aggregate print setting "2in1" is set, the number of printed sheets remains to be one and the charged fee is not changed. In such a case, even if the first addition format (the superscript ruby) is preferentially selected, the layout condition in which the number of printed sheets is kept is satisfied.

Therefore, when the document obtained by the format conversion is printed and the print setting is set to Nin1, the layout condition may be that the number of output sheets of the printed document is not increased from the number of output sheets to be used by printing the original document.

As described above, the embodiment is explained by using the drawings. However, in the present invention, the concrete configuration is not limited to the above embodiment. In the present invention, various modifications of the above embodiment or the addition of various functions or the like to the embodiment can be carried out without departing from the gist of the invention.

In this embodiment, the first addition format and the second addition format are explained as the addition format. However, as the addition format for the additional information, another addition format except the above formats may be used. For example, a suitable addition format may be selected among three or more addition formats according to the priority order.

In this embodiment, the document in which the text of the original document is described in Japanese and the kana pronouncing is added as the additional information, is prepared. However, the technology disclosed in the embodiment can be applied to the document in which the text of the original document is described in other languages, such as English. For example, in case that the text of the original document is described in English, the phonetic symbol, the translation of the English word, or the like may be added as the additional information.

In this embodiment, the information added document preparation device 10 is explained. The technology disclosed in the embodiment may be applied to the program to be executed by an information processing device.

One of the objects of the above embodiment is to provide an information added document preparation device, a non-transitory computer-readable recording medium and an information added document preparation method which can add the additional information, such as the kana pronouncing or the like, to the original document in a suitable addition format.

In this embodiment, when the additional information is added, the addition format in which the prepared document satisfies the layout condition is automatically selected.

In this embodiment, the retention of the page allocation of the original document is the layout condition.

In this embodiment, in case that the prepared document is printed, the condition in which the number of output sheets of the printed document is not increased is the layout condition. For example, when the print setting "Nin1" is set, there are some cases in which the number of output sheets of the printed document is not increased even if the number of pages of the prepared document is increased due to the addition of the additional information.

According to the information added document preparation device, the non-transitory computer-readable recording medium and the information added document preparation method, it is possible to add the additional information, such as the kana pronouncing or the like, to the original document in a suitable addition format.

The present U.S. patent application claims the priority of Japanese Patent Application No. 2015-213349, filed on Oct. 29, 2015, according to the Paris Convention, and the entirety of which is incorporated herein by reference for correction of incorrect translation.

What is claimed is:

1. An information added document preparation device, comprising:
a read-only memory storing software programs; and
a CPU, which when executing instructions according to the software programs, functions as:
a selection unit configured to select a particular addition format to be used when predetermined additional information is added to an original document, the particular addition format being selected by the selection unit as either a first addition format or a second addition format; and
an information adding unit having a plurality of addition formats including the first addition format and the second addition format, the information adding unit configured to prepare a document in which the predetermined additional information is added to the original document in the particular addition format selected by the selection unit,
wherein the selection unit, before selecting the particular addition format, determines whether a predetermined layout condition would be satisfied as a result of adding the predetermined additional information according to the particular addition format, and then the selection unit selects the particular addition format from among the plurality of addition formats upon determining that the predetermined layout condition would be satisfied,
the predetermined layout condition is a requirement to maintain the number of output pages displayed on a screen or printed on a sheet when the document prepared by the information adding unit is output,
the first addition format causes lines of text of the original document to be present without a change in content but with a change in position within a document prepared by the information adding unit, and the second addition format causes lines of text of the original document to be present with changes in content and position within a document prepared by the information adding unit.

2. The information added document preparation device of claim 1, wherein the predetermined additional information is at least one of a kana pronouncing, a ruby, a translation, an explanatory note of a predetermined target text.

3. The information added document preparation device of claim 1, wherein:
according to the first addition format, the predetermined additional information is added along a predetermined target text of the original document in a space between lines of text of the original document, and
according to the second addition format, the predetermined additional information is added with parentheses behind the target text and within a line of text of the original document.

4. The information added document preparation device of claim 3, wherein
the selection unit determines whether the predetermined layout condition would be satisfied by checking whether the predetermined layout condition would be satisfied with the first addition format before checking whether the predetermined layout condition would be satisfied with the second addition format,
if the predetermined layout condition would be satisfied with the first addition format, the selection unit selects the first addition format from the plurality of addition formats to be the particular addition format,
if the predetermined layout condition would not be satisfied with the first addition format, the selection unit determines whether the predetermined layout condition would be satisfied by checking whether the predetermined layout condition would be satisfied with the second addition format, and then if the predetermined layout condition would be satisfied with the second addition format, the selection unit selects the second addition format from the plurality of addition formats to be the particular addition format.

5. The information added document preparation device of claim 1, wherein the predetermined layout condition is a retention of a page allocation of the original document.

6. The information added document preparation device of claim 1, wherein the predetermined layout condition is that the document prepared by the information adding unit has a total number of pages that is not increased compared to that of the original document.

7. The information added document preparation device of claim 1, wherein the predetermined layout condition is that when the prepared document is printed at a designated print setting, the printed document has a total number of output sheets that is not increased compared to printing the original document.

8. The information added document preparation device of claim 1, wherein the output pages, referred to in the requirement of the predetermined layout condition, correspond to displayed pages when the document prepared by the information adding unit is displayed.

9. The information added document preparation device of claim 1, wherein the output pages, referred to in the requirement of the predetermined layout condition, correspond to printed sheets when the document prepared by the information adding unit is printed.

10. The information added document preparation device of claim 1, wherein the predetermined layout condition includes a condition in which a plurality of pages are printed on one sheet.

11. A non-transitory computer-readable recording medium in which a program is stored, wherein the program causes an information processing device, which has a plurality of addition formats, to:
    determine whether a predetermined layout condition would be satisfied as a result of adding predetermined additional information, according a particular addition format, to an original document;
    select the particular addition format from among the plurality of addition formats upon determining that the predetermined layout condition would be satisfied, the particular addition format being selected as either a first addition format or a second addition format; and
    prepare a document in which the predetermined additional information, in the particular addition format that was selected, is added to the original document,
    wherein the predetermined layout condition is a requirement to maintain the number of output pages displayed on a screen or printed on a sheet when the prepared document is output,
    the first addition format causes lines of text of the original document to be present without a change in content but with a change in position within a document prepared by adding the predetermined additional information, and the second addition format causes lines of text of the original document to be present with changes in content and position within a document prepared by adding the predetermined additional information.

12. The non-transitory computer-readable recording medium of claim 11, wherein the predetermined additional information is at least one of a kana pronouncing, a ruby, a translation, an explanatory note of a predetermined target text.

13. The non-transitory computer-readable recording medium of claim 11, wherein:
    according to the first addition format, the predetermined additional information is added along a predetermined target text of the original document in a space between lines of text of the original document, and
    according to the second addition format, the predetermined additional information is added with parentheses behind the target text and within a line of text of the original document.

14. The non-transitory computer-readable recording medium of claim 13, wherein the information processing device determines whether the predetermined layout condition would be satisfied by checking whether the predetermined layout condition would be satisfied with the first addition format before checking whether the predetermined layout condition would be satisfied with the second addition format.

15. The non-transitory computer-readable recording medium of claim 11, wherein the predetermined layout condition is a retention of a page allocation of the original document.

16. The non-transitory computer-readable recording medium of claim 11, wherein the predetermined layout condition is that the prepared document has a total number of pages that is not increased compared to that of the original document.

17. The non-transitory computer-readable recording medium of claim 11, wherein
    the predetermined layout condition is that when the prepared document is printed at a designated print setting, the printed document has a total number of output sheets that is not increased compared to printing the original document,
    if the predetermined layout condition would be satisfied with the first addition format, the program causes an information processing device to select the first addition format from the plurality of addition formats to be the particular addition format,
    if the predetermined layout condition would not be satisfied with the first addition format, the program causes an information processing device to determine whether the predetermined layout condition would be satisfied by checking whether the predetermined layout condition would be satisfied with the second addition format, and then
    if the predetermined layout condition would be satisfied with the second addition format, the program causes an information processing device to select the second addition format from the plurality of addition formats to be the particular addition format.

18. The non-transitory computer-readable recording medium of claim 11, wherein the output pages, referred to in the requirement of the predetermined layout condition, correspond to displayed pages when the prepared document is displayed.

19. The non-transitory computer-readable recording medium of claim 11, wherein the output pages, referred to in the requirement of the predetermined layout condition, correspond to printed sheets when the prepared document is printed.

20. The non-transitory computer-readable recording medium of claim 11, wherein the predetermined layout condition includes a condition in which a plurality of pages are printed on one sheet.

21. An information added document preparation method performed by an information processing device having a plurality of addition formats, the method comprising:

determining whether a predetermined layout condition would be satisfied as a result of adding predetermined additional information, according a particular addition format, to an original document;

selecting the particular addition format from among the plurality of addition formats upon determining that the predetermined layout condition would be satisfied, the particular addition format being selected as either a first addition format or a second addition format; and preparing a document in which the predetermined additional information, in the particular addition format that was selected, is added to the original document, wherein the predetermined layout condition is a requirement to maintain the number of output pages displayed on a screen or printed on a sheet when the prepared document is output, the first addition format causes lines of text of the original document to be present without a change in content but with a change in position within a document prepared by adding the predetermined additional information, and the second addition format causes lines of text of the original document to be present with changes in content and position within a document prepared by adding the predetermined additional information.

22. The information added document preparation method of claim 21, wherein the output pages, referred to in the requirement of the predetermined layout condition, correspond to displayed pages when the prepared document is displayed.

23. The information added document preparation method of claim 21, wherein the output pages, referred to in the requirement of the predetermined layout condition, correspond to printed sheets when the prepared document is printed.

24. The information added document preparation method of claim 21, wherein the predetermined layout condition includes a condition in which a plurality of pages are printed on one sheet.

* * * * *